United States Patent
Gribbin, Jr. et al.

(10) Patent No.: US 11,857,886 B2
(45) Date of Patent: Jan. 2, 2024

(54) METHOD OF BOGIE REPLACEMENT FOR TURNTABLE STATION

(71) Applicant: UNIVERSAL CITY STUDIOS LLC, Universal City, CA (US)

(72) Inventors: David Andrew Gribbin, Jr., Clermont, FL (US); Michael David Russell, Jr., Orlando, FL (US); Harrison Raleigh Smith, Orlando, FL (US); Daniel Roman Swando, Kissimmee, FL (US)

(73) Assignee: UNIVERSAL CITY STUDIOS LLC, Universal City, CA (US)

( * ) Notice: Subject to any disclaimer, the term of this patent is extended or adjusted under 35 U.S.C. 154(b) by 359 days.

(21) Appl. No.: 17/362,769

(22) Filed: Jun. 29, 2021

(65) Prior Publication Data
US 2022/0001286 A1 Jan. 6, 2022

Related U.S. Application Data

(60) Provisional application No. 63/047,149, filed on Jul. 1, 2020.

(51) Int. Cl.
*B23P 6/00* (2006.01)
*A63G 31/02* (2006.01)
(Continued)

(52) U.S. Cl.
CPC ............... *A63G 4/00* (2013.01); *A63G 31/02* (2013.01); *B23P 6/00* (2013.01); *B23P 19/04* (2013.01);
(Continued)

(58) Field of Classification Search
CPC ... A63G 1/02; A63G 4/00; B61B 1/02; B65G 29/00; Y10T 29/4973; Y10T 29/53404; B23P 6/00; B23P 19/00; B23P 19/04
See application file for complete search history.

(56) References Cited

U.S. PATENT DOCUMENTS 3,251,311 A 5/1966 Saxonmeyer
9,162,653 B2 10/2015 Escande et al.
(Continued)

FOREIGN PATENT DOCUMENTS

EP 2623379 A1 8/2013
WO 2011001066 A1 1/2011
WO 2012041140 A1 4/2012

OTHER PUBLICATIONS

International Search Report and Written Opinion, PCT/US2021/040005, dated Sep. 29, 2021, 7 pgs.

*Primary Examiner* — Jermie E Cozart
(74) *Attorney, Agent, or Firm* — LOZA & LOZA, LLP; Lew Edward V. Macapagal

(57) ABSTRACT

Aspects of the disclosure relate to methods, apparatus, and systems for replacing a drive assembly of a turntable load station. A system includes a structural pier, a track formed on a top surface of the structural pier, a turntable, a bogie assembly detachably coupled to an underside of the turntable, the bogie assembly including a wheeled drive assembly, a swap rail mounted to a radial side surface of the structural pier, and a translating cartridge movably mounted to the swap rail in a serviceable orientation. The translating cartridge is configured to move along the radial side surface of the structural pier via the swap rail while in the serviceable orientation to an unloading position underneath the bogie assembly, pivot from the serviceable orientation to an upright functional orientation to couple with the wheeled drive assembly, and decouple the wheeled drive assembly from the bogie assembly.

21 Claims, 8 Drawing Sheets

(51) Int. Cl.
  *B61B 1/02*    (2006.01)
  *B23P 19/04*   (2006.01)
  *A63G 4/00*    (2006.01)
  *B61B 1/00*    (2006.01)
  B23P 19/00     (2006.01)
  B65G 29/00     (2006.01)

(52) U.S. Cl.
  CPC ............... *B61B 1/00* (2013.01); *B61B 1/02* (2013.01); *B23P 19/00* (2013.01); *B65G 29/00* (2013.01); *Y10T 29/4973* (2015.01); *Y10T 29/53404* (2015.01)

(56) References Cited

U.S. PATENT DOCUMENTS

| | | |
|---|---|---|
| 2004/0035314 A1* | 2/2004 | Muchalov ............. B62D 65/18 104/44 |
| 2009/0269175 A1 | 10/2009 | Rose et al. |
| 2011/0226150 A1 | 9/2011 | Esposti et al. |
| 2012/0052961 A1 | 3/2012 | Crawford et al. |
| 2013/0145953 A1 | 6/2013 | Crawford et al. |
| 2019/0388793 A1 | 12/2019 | McVeen et al. |
| 2021/0062567 A1 | 3/2021 | Majdali et al. |

* cited by examiner

METHOD OF BOGIE REPLACEMENT FOR TURNTABLE STATION

CROSS-REFERENCE TO RELATED APPLICATION

This application claims priority to and the benefit of U.S. Provisional Application Ser. No. 63/047,149 entitled "METHOD OF BOGIE REPLACEMENT FOR TURNTABLE STATION" filed on Jul. 1, 2020, the entire contents of which is incorporated herein by reference as if fully set forth below in its entirety and for all applicable purposes.

TECHNICAL FIELD

The technology discussed below relates generally to turntable load stations for loading/unloading passengers onto/from a ride system, and more particularly, to a system and method for efficiently removing an inoperative drive assembly of a turntable load station and installing a working replacement.

INTRODUCTION

Amusement parks attract hundreds of millions of visitors each year. To help the visitors enjoy certain attractions or rides, amusement park operators have developed various types of systems and methods for loading passengers onto (and unloading the passengers from) an attraction/ride. In one example, a turntable load station may be used to load/unload the passenger.

In many cases, a turntable load station for a ride system may need to be available for continuous use for a large part of a day (e.g., 16 hours a day), 365 days a year. The turntable load station may be driven by one or more drive assemblies, each drive assembly having various combinations of a motor, a gearbox, a brake, etc. A drive assembly may have high reliability but will fail at some point during its service life. When failure occurs, station operators would benefit from an efficient method for changing the drive assembly with minimal impact to run time. Current methods are overly manual and require intermediary clamping of unwieldy assemblies to an adjacent station structure. As such, there is need for a system and method for quickly and safely uninstalling a non-working drive assembly and installing a working replacement.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the disclosure relate to methods, apparatus, and systems for replacing a drive assembly of a turntable load station. A system includes a structural pier, a track formed on a top surface of the structural pier, a movable turntable structure, and a first bogie assembly detachably coupled to an underside of the movable turntable structure, the first bogie assembly comprising a first wheeled drive assembly configured to drive a wheel to roll on the track. The system further includes a swap rail mounted to a radial side surface of the structural pier and a first translating cartridge movably mounted to the swap rail in a serviceable orientation. The first translating cartridge is configured to move along the radial side surface of the structural pier via the swap rail while in the serviceable orientation to an unloading position underneath the first bogie assembly coupled to the movable turntable structure, pivot from the serviceable orientation to an upright functional orientation to couple with the first wheeled drive assembly, and decouple the first wheeled drive assembly from the first bogie assembly or decouple the first bogie assembly comprising the first wheeled drive assembly coupled to the first translating cartridge from the movable turntable structure. The first translating cartridge may also be configured to move into a position to couple with the wheeled drive assembly, decouple and move the wheeled drive assembly away from the movable turntable structure, pivot from the upright functional orientation to the serviceable orientation, and move along the radial side surface of the structural pier via the swap rail while in the serviceable orientation from the unloading position over to a teardown position. Other aspects, embodiments, and features are also claimed and described.

In one example, a system for replacing a drive assembly of a turntable load station is disclosed. The system includes a structural pier, a track formed on a top surface of the structural pier, a movable turntable structure, a first bogie assembly detachably coupled to an underside of the movable turntable structure, the first bogie assembly comprising a first wheeled drive assembly configured to drive a wheel to roll on the track, a swap rail mounted to a radial side surface of the structural pier, a first translating cartridge movably mounted to the swap rail in a serviceable orientation, the first translating cartridge configured to pivot from the serviceable orientation to an upright functional orientation to couple with the first wheeled drive assembly and decouple the first wheeled drive assembly coupled to the first translating cartridge from the first bogie assembly or decouple the first bogie assembly comprising the first wheeled drive assembly coupled to the first translating cartridge from the movable turntable structure (e.g., move the first wheeled drive assembly away from the movable turntable structure and reorient the first wheeled drive assembly to the serviceable orientation), a second translating cartridge movably mounted to the swap rail in the serviceable orientation, the second translating cartridge coupled to a second wheeled drive assembly (hot spare) or a second bogie assembly comprising the second wheeled drive assembly and configured to pivot (or reorient) from the serviceable orientation to the upright functional orientation while coupled to the second wheeled drive assembly or the second bogie assembly comprising the second wheeled drive assembly, and couple the second wheeled drive assembly to the first bogie assembly or couple the second bogie assembly comprising the second wheeled drive assembly to the underside of the movable turntable structure.

In one example, a method for replacing a drive assembly of a turntable load station is disclosed. The method includes identifying for replacement a first bogie assembly detachably coupled to an underside of a movable turntable structure (e.g., via manual or automated methods including methods based on inspecting a sensor), the first bogie assembly comprising a first wheeled drive assembly configured to drive a wheel to roll on a track formed on a top surface of a structural pier, moving a first translating cartridge along a radial side surface of the structural pier while in a serviceable orientation to an unloading position underneath the first bogie assembly coupled to the movable turntable structure, pivoting the first translating cartridge from the serviceable orientation to an upright functional orientation, coupling the first translating cartridge to the first wheeled drive assembly while in the upright functional orientation, decoupling the first wheeled drive assembly coupled to the first translating cartridge from the first bogie assembly or decoupling the first bogie assembly comprising the first wheeled drive assembly coupled to the first translating cartridge from the movable turntable structure, moving a second translating cartridge coupled to a second wheeled drive assembly or a second bogie assembly comprising the second wheeled drive assembly along the radial side surface of the structural pier while in the serviceable orientation to a loading position underneath the first bogie assembly decoupled from the first wheeled drive assembly or underneath a location of the movable turntable structure at which the first bogie assembly comprising the first wheeled drive assembly is decoupled from the movable turntable structure, pivoting the second translating cartridge from the serviceable orientation to the upright functional orientation while coupled to the second wheeled drive assembly or the second bogie assembly comprising the second wheeled drive assembly, and coupling the second wheeled drive assembly to the first bogie assembly or coupling the second bogie assembly comprising the second wheeled drive assembly to the underside of the movable turntable structure.

In one example, a method for replacing a drive assembly of a turntable load station is disclosed. The method includes identifying for replacement a drive assembly detachably coupled to a bogie assembly on a movable turntable structure, the drive assembly configured to drive a wheel to roll on a track formed on a top surface of a structural pier, moving and coupling a translating cartridge to the drive assembly while in an upright functional orientation, detaching the drive assembly coupled to the translating cartridge from the bogie assembly, moving the translating cartridge with the drive assembly away from the movable turntable structure and pivoting the translating cartridge to a serviceable configuration, moving the translating cartridge along a radial side surface of the structural pier while in the serviceable orientation from an unloading position to a teardown position, moving a second translating cartridge coupled to a second drive assembly (hot spare) along the radial side surface of the structural pier while in the serviceable orientation to a loading position underneath an undriven bogie assembly under the movable turntable structure, pivoting the second translating cartridge while coupled to the second drive assembly from the serviceable orientation to the upright functional orientation, and attaching the second drive assembly to the bogie assembly.

In one example, a turntable load station is disclosed. The turntable load station includes a structural pier, a track formed on a top surface of the structural pier, a movable turntable structure, a first bogie assembly detachably coupled to an underside of the movable turntable structure, the first bogie assembly comprising a first wheeled drive assembly configured to drive a wheel to roll on the track, wherein the movable turntable structure is caused to rotate about an axis when the wheel rolls on the track, a swap rail mounted to a radial side surface of the structural pier, and a first translating cartridge movably mounted to the swap rail in a serviceable orientation, the first translating cartridge configured to move along the radial side surface of the structural pier via the swap rail while in the serviceable orientation to an unloading position underneath the first bogie assembly coupled to the movable turntable structure, pivot from the serviceable orientation to an upright functional orientation to couple with the first wheeled drive assembly, decouple the first wheeled drive assembly coupled to the first translating cartridge from the first bogie assembly or decouple the first bogie assembly comprising the first wheeled drive assembly coupled to the first translating cartridge from the movable turntable structure, and pivot from the upright functional orientation to the serviceable orientation while coupled to the first wheeled drive assembly. The turntable load station further includes a second translating cartridge movably mounted to the swap rail in the serviceable orientation, the second translating cartridge coupled to a second wheeled drive assembly or a second bogie assembly comprising the second wheeled drive assembly and configured to move along the radial side surface of the structural pier while in the serviceable orientation to a loading position underneath the first bogie assembly decoupled from the first wheeled drive assembly or underneath a location of the movable turntable structure at which the first bogie assembly comprising the first wheeled drive assembly is decoupled from the movable turntable structure, pivot from the serviceable orientation to the upright functional orientation while coupled to the second wheeled drive assembly or the second bogie assembly comprising the second wheeled drive assembly, couple the second wheeled drive assembly to the first bogie assembly or couple the second bogie assembly comprising the second wheeled drive assembly to the underside of the movable turntable structure, decouple from the second wheeled drive assembly or the second bogie assembly comprising the second wheeled drive assembly, and pivot from the upright functional orientation to the serviceable orientation while decoupled from the second wheeled drive assembly coupled to the first bogie assembly or while decoupled from the second bogie assembly comprising the second wheeled drive assembly coupled to the underside of the movable turntable structure.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and/or packaging arrangements.

Figure 1:
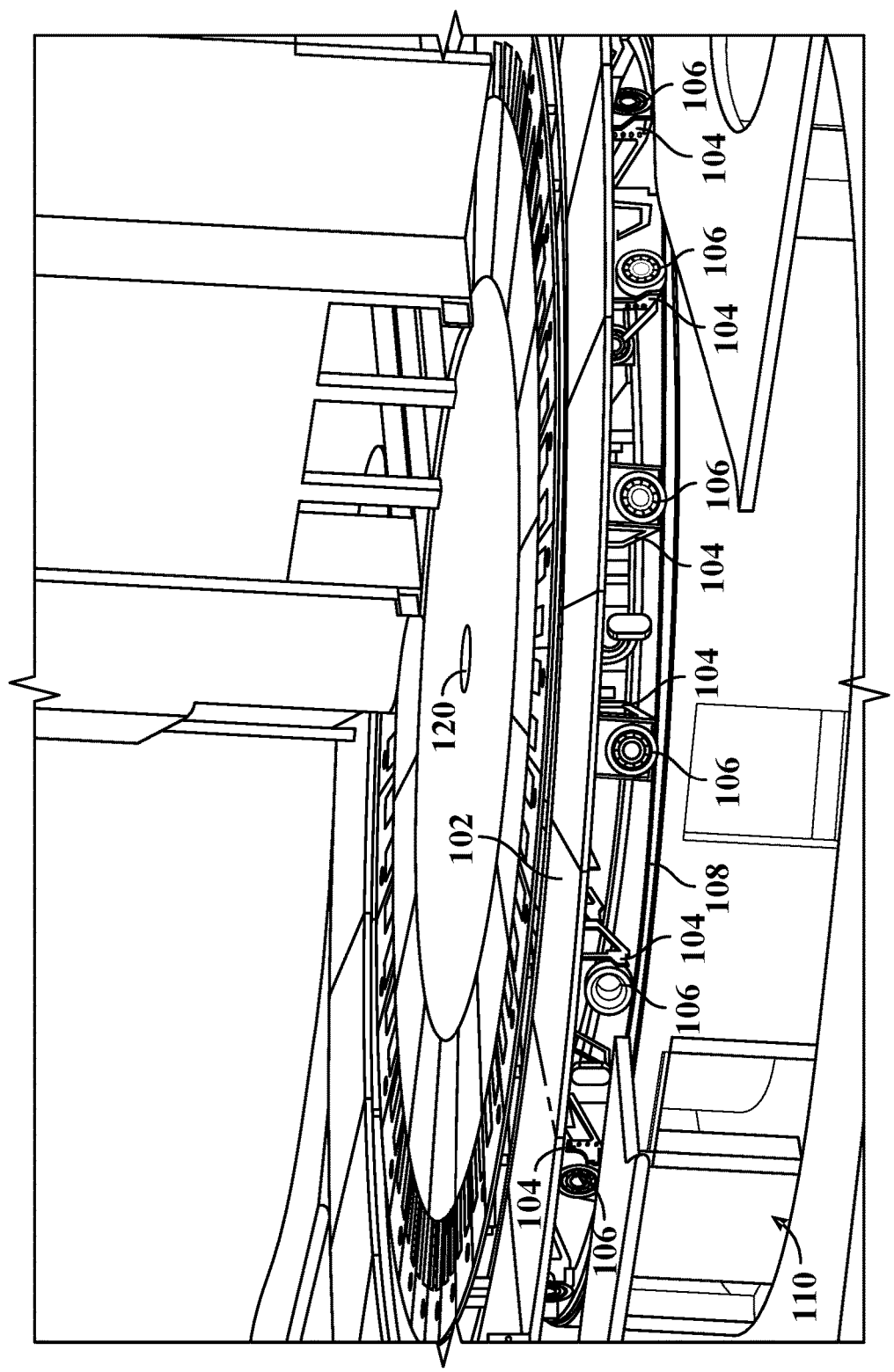
FIG. 1 illustrates a perspective view of an example turntable load station according to an aspect of the present disclosure.

FIG. 1 illustrates a perspective view of an example turntable load station 100 according to an aspect of the present disclosure. The station 100 may be used for loading guests/passengers onto (and unloading guests/passengers from) a theme park attraction or ride. In an aspect, the station 100 may be used for other applications such as tracked or trackless conveyance systems, for example. The station 100 may include a turntable 102 (e.g., movable turntable structure) configured to rotate about an axis 120. In an aspect, the guests/passengers may stand on top of the turntable 102 to be conveyed into/out of the attraction/ride as the turntable 102 rotates about the axis 120. In an aspect, wheels (e.g., passive load wheels) may be mounted to a central underside portion of the turntable 102 to help rotate the turntable 102 about the axis 120.

The station 100 may further include bogie assemblies 104 (e.g., 8 or more bogie assemblies) mounted to an outer peripheral underside portion of the turntable 102. Each bogie assembly 104 serves as a chassis or framework for carrying a wheel 106. The station 100 may also include a structural pier (or ring) 110 (e.g., concrete pier/ring) formed around the axis 120 and a track 108 that sits on a top surface of the structural pier 110. Each of the wheels 106 are configured to roll along the track 108. Accordingly, when the wheels 106 are driven to roll along the track 108 (e.g., via a drive motor), each bogie assembly 104 carrying a respective wheel 106 is caused to move along the track 108 and rotate about the axis 120, which in turn causes the turntable 102 coupled to the bogie assemblies 104 to also rotate about the axis 120. When the wheels 106 are caused to stop rolling along the track 108 (e.g., via wheel braking or disabling a drive motor), each bogie assembly 104 carrying a respective wheel 106 is caused to stop rotating about the axis 120, which in turn causes the turntable 102 to also stop rotating about the axis 120.

Figure 2:
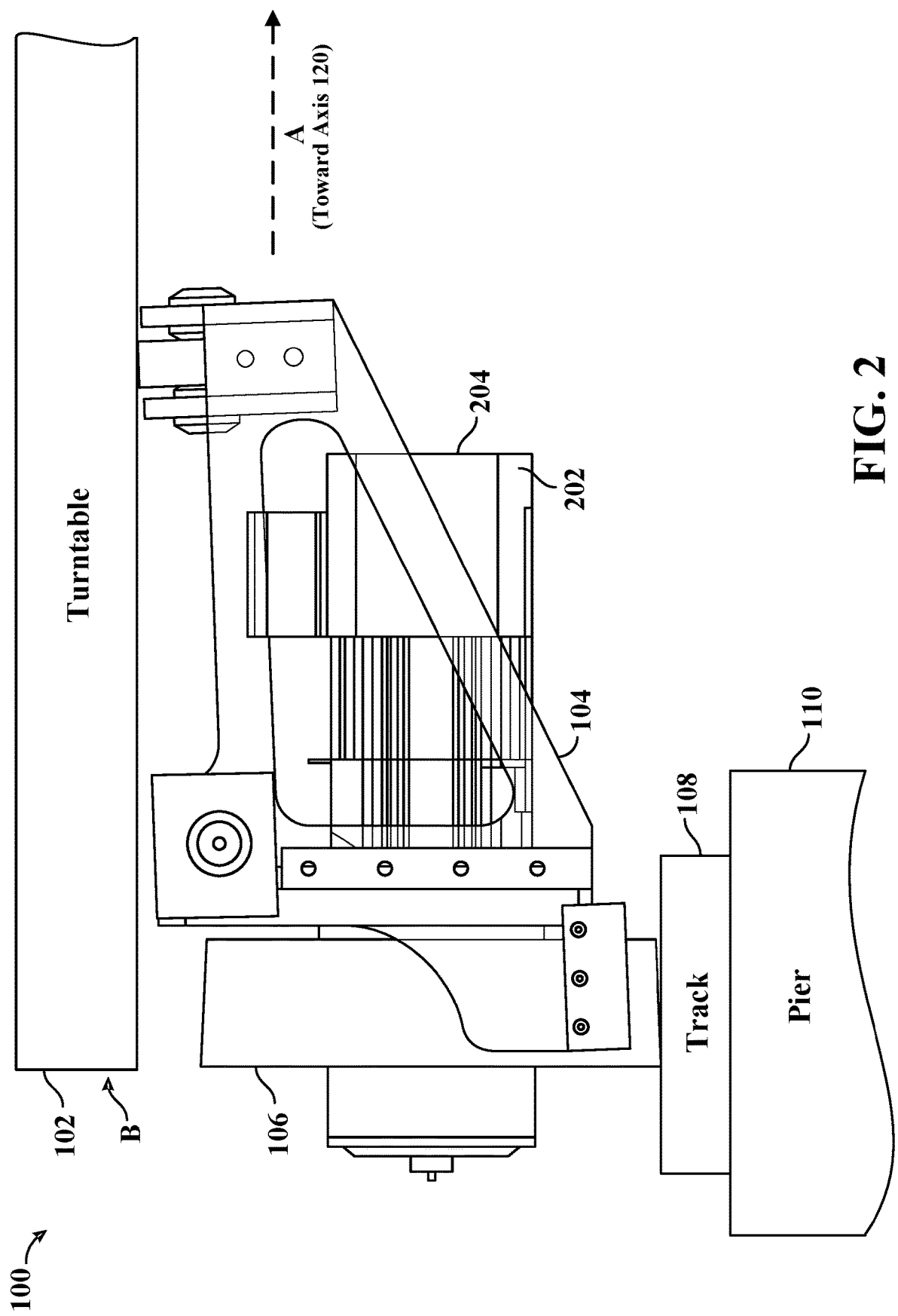
FIG. 2 is a side view of a bogie mounted in the turntable load station according to an aspect of the present disclosure.
Figure 3:
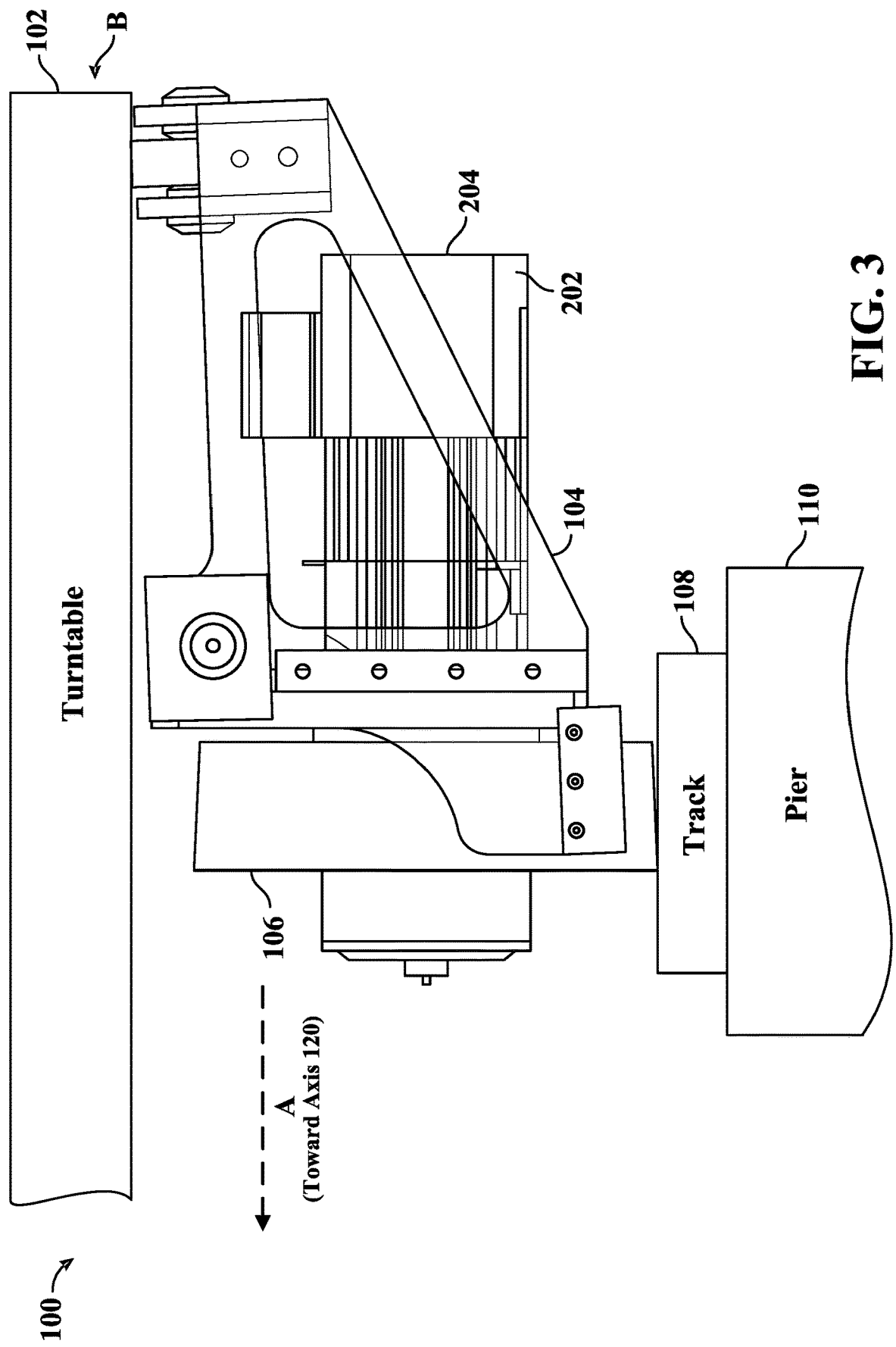
FIG. 3 is a side view of a bogie mounted in the turntable load station according to another aspect of the present disclosure.

FIG. 2 is a side view of a bogie assembly 104 mounted in the turntable load station 100 according to an aspect of the present disclosure. FIG. 3 is a side view of a bogie assembly 104 mounted in the turntable load station 100 according to another aspect of the present disclosure.

Referring to FIGS. 2 and 3, the bogie assembly 104 is mounted to the underside of the turntable 102 and above the track 108. The bogie assembly 104 may include mechanical fittings and/or support structures configured to adjust a position of the bogie assembly 104/wheel 106 with respect to the track 108 (e.g., toe adjustment). The bogie assembly 104 may further include a drive assembly 202 operationally coupled to (or including) the wheel 106 carried by the bogie assembly 104. The drive assembly 202 may be a combination of various devices/systems configured to produce a torque that drives the wheel 106 to roll. For example, the drive assembly 202 may be a combination of at least a motor, a transmission (gearbox), and an axle coupled to the wheel 106. The combination may further include a brake system configured to decelerate and/or stop wheel roll. In an aspect, the drive assembly 202 is electrically powered. For example, a slip ring connected through a central portion of the turntable 102 may provide electric power to the drive assembly 202. The slip ring may also provide an Ethernet connection through which the drive assembly 202 may receive input signals from and/or send output signals to a control system.

When a respective wheel 106 of the station 100 is driven by the drive assembly 202 to roll along the track 108, the bogie assembly 104 carrying the respective wheel 106 is caused to move along the track 108 and rotate about the axis 120. As such, a combination of rotating bogie assemblies 104 causes the turntable 102 coupled to the rotating bogie assemblies 104 to also rotate about the axis 120. When the respective wheel 106 is caused to stop rolling along the track 108 via the drive assembly 202, the bogie assembly 104 carrying the respective wheel 106 is caused to stop along the track 108 and cease rotation about the axis 120. Thus, the combination of stopped bogie assemblies 104 causes the turntable 102 coupled to the stopped bogie assemblies 104 to also cease rotation about the axis 120.

The axis 120 (see FIG. 1) is located at a central portion of the turntable 102. As shown in FIGS. 2 and 3, the axis 120 is located toward a direction A with respect to the bogie assembly 104. Accordingly, in the aspect shown in FIG. 2, the bogie assembly 104 may be mounted under the turntable 102 and above the track 108 such that a rear portion 204 of the drive assembly 202 is positioned in closer proximity to the axis 120 (located toward the direction A) than the wheel 106. As such, the wheel 106 is positioned in closer proximity to an outer peripheral surface B of the turntable 102 than the rear portion 204 of the drive assembly 202. In another aspect shown in FIG. 3, the bogie assembly 104 may be mounted under the turntable 102 and above the track 108 such that the wheel 106 is positioned in closer proximity to the axis 120 (located toward the direction A) than the rear portion 204 of the drive assembly 202. As such, the rear portion 204 of the drive assembly 202 is positioned in closer proximity to the outer peripheral surface B of the turntable 102 than the wheel 106.

In an aspect, the drive assembly 202 may fail to perform during the course of its service life, e.g., the motor, the gearbox, the axle, and/or the brake system of the drive assembly 202 may become disabled. Accordingly, when failure occurs, a station technician may need to perform various procedures that contribute to a prolonged downtime of the station 100 and/or subject the technician to potentially dangerous conditions. For example, to replace a non-operational drive assembly, the station technician may need to sequentially secure the drive assembly to a support structure (e.g., using a beam clamp), separate the drive assembly from the wheel/bogie assembly, suspend the drive assembly, and lower the non-operational drive assembly (e.g., with a jack) to the floor. The station technician may then repeat the steps in reverse to install a working replacement. Given the weight of the drive assembly (e.g., approximately 2600 pounds) and the height at which the drive assembly is mounted onto the turntable load station (e.g., approximately 12 feet above the floor or higher), performing all of the necessary steps to replace the disabled drive assembly subjects the station technician to numerous ergonomic and safety risks that are potentially harmful. For example, the station technician is subjected to the risk of having the weight of the drive assembly fall on his/her body and/or the risk of falling from a high elevation at which the drive assembly is mounted. Moreover, performing such sequential manual operations is time-consuming leading to a prolonged downtime of the station 100.

Figure 4:
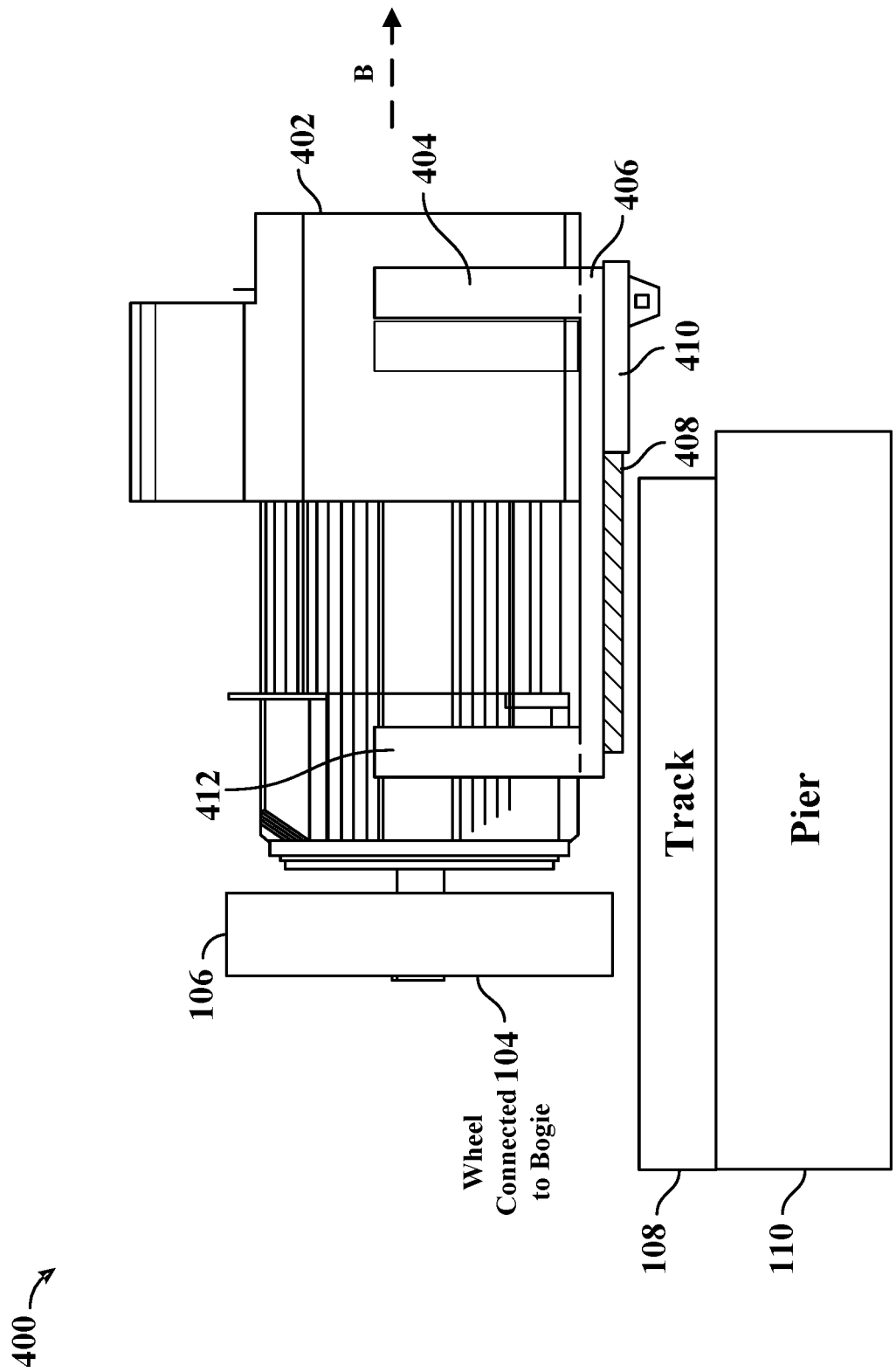
FIG. 4 illustrates a replacement system for uninstalling a non-working drive assembly of a turntable load station and installing a working replacement in a safe manner according to an aspect of the present disclosure.

FIG. 4 illustrates a replacement system 400 for quickly uninstalling a non-working drive assembly of a turntable load station 100 and installing a working replacement in a safe manner according to an aspect of the present disclosure. In an aspect, the system 400 includes a self-contained drive assembly 402 coupled to a wheel 106. Although not shown, the drive assembly 402 and the wheel 106 depicted in FIG. 4 are coupled to a bogie assembly 104 (as depicted in FIGS. 2 and 3).

In an aspect, the drive assembly 402 may be mounted in a turntable load station structure without being coupled to a wheel. For example, the drive assembly 402 may be tangentially mounted to an inner radial side surface of the structural pier 110 (e.g., if the bogie 104 is mounted such that a rear portion of the drive assembly is in closer proximity to a center axis 120 of the station 100 than the wheel 106 as depicted in FIG. 2). Alternatively, the drive assembly 402 may be tangentially mounted to an outer radial side surface of the structural pier 110 (e.g., if the bogie 104 is mounted such that the wheel 106 is in closer proximity to the center axis 120 of the station 100 than the rear portion of the drive assembly as depicted in FIG. 3). As such, the drive assembly 402 may be pre-mounted in the station structure as a spare drive assembly ready to replace a working drive assembly that may become disabled.

The system 400 further includes a translating cartridge 404 configured to mount the drive assembly 402 to the inner/outer radial side surface of the structural pier 110. The translating cartridge 404 may include an adapter plate 406 that is detachably coupled to an underside of the drive assembly 402, and at least one upright bar 412 that extends from the adapter plate 406 and is detachably coupled to a side surface of the drive assembly 402. The translating cartridge 404 may further include one or more linear slide rails 408 coupled to an underside of the adapter plate 406 and a tipping slide carriage 410 also coupled to the underside of the adapter plate 406. The one or more slide rails 408 engage the slide carriage 410 such that when the drive assembly 402 is disconnected from the wheel 106/bogie assembly 104, the one or more slide rails 408 may pass through the slide carriage 410 in a longitudinal direction as the translating cartridge 404 (and the drive assembly 402 coupled to the translating cartridge 404) is pulled away from the wheel 106 (e.g., pulled in a direction B shown in FIG. 4). In an aspect, the wheel 106 may remain connected to the drive assembly 402, and therefore, the drive assembly 402 and the wheel 106 may both be pulled in the direction B (or direction E shown in FIG. 5) when the translating cartridge 404 is moved in such direction. As such, a jack may be used to increase space between the track 108 and the turntable 102 (e.g., increase by approximately 0.75 inches) to clear a size of the wheel 106 and allow the wheel 106 to be moved in the direction B (or direction E). In an aspect, the slide carriage 410 may be mounted to the inner/outer radial side surface of the structural pier 110 (either directly or indirectly via a supporting member or structure).

Figure 5:
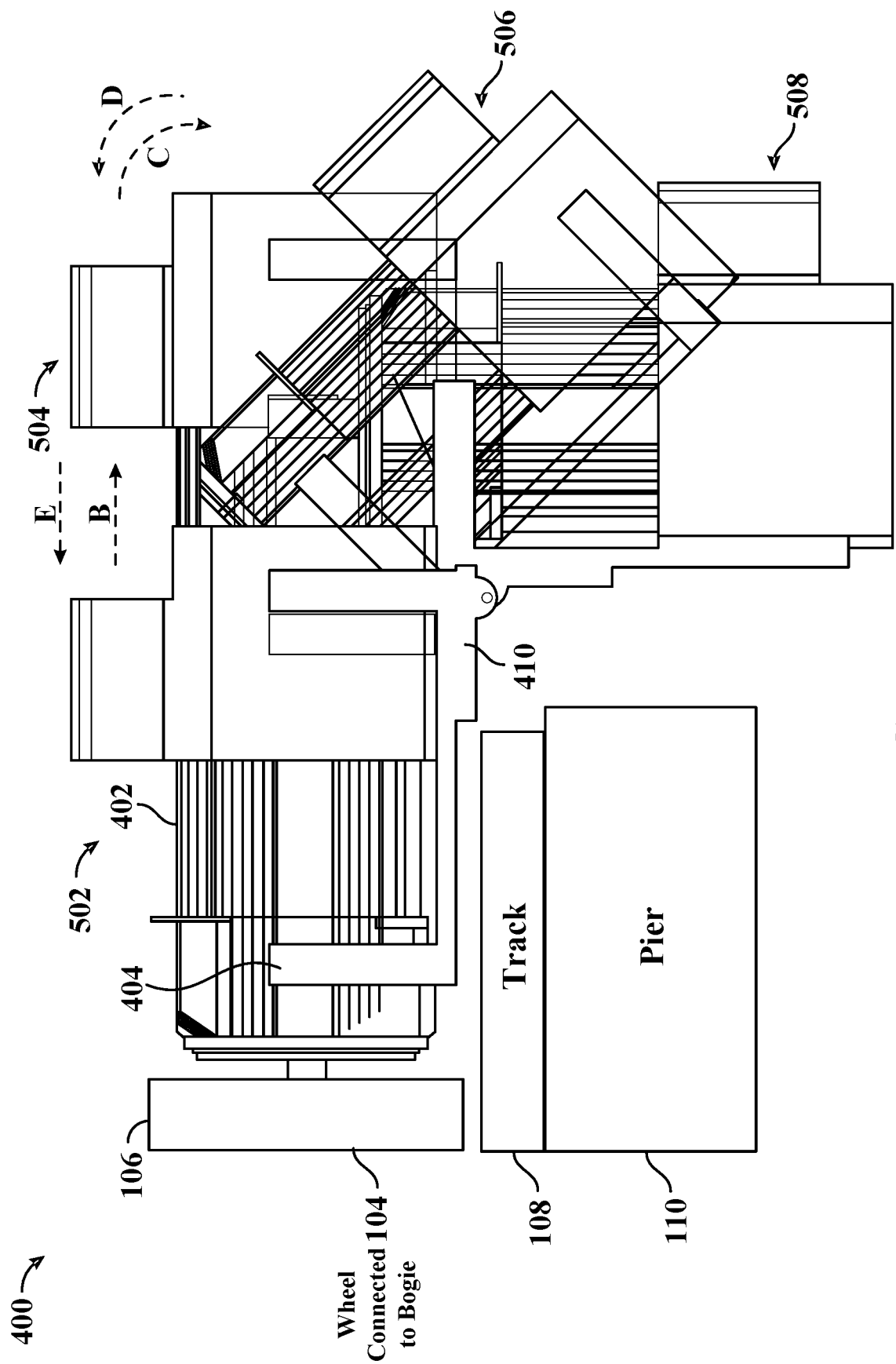
FIG. 5 illustrates example positions/orientations and movement of the replacement system depicted in FIG. 4 according to an aspect of the present disclosure.

FIG. 5 illustrates example positions/orientations and movement of the replacement system 400 depicted in FIG. 4 according to an aspect of the present disclosure. Here, the drive assembly 402 is coupled to the translating cartridge 404. At a position 502, the drive assembly 402 is at an upright functional orientation (e.g., horizontal or near-horizontal orientation). At the upright functional orientation, the drive assembly 402 may be coupled to the wheel 106/bogie assembly 104. If, for example, the drive assembly 402 becomes disabled (e.g., motor stops working), the drive assembly 402 may be decoupled from the wheel 106/bogie assembly 104. After decoupling, the drive assembly 402 may be pulled away from the wheel 106 (i.e., pulled in the direction B). That is, the drive assembly 402 may be pulled in the direction B such that the one or more slide rails 408 pass through the slide carriage 410 in the longitudinal direction until the drive assembly 402 reaches a position 504. At the position 504, the slide carriage 410 may facilitate a tilt of the drive assembly 402 in a downward and away direction (e.g., direction C) with respect to the wheel 106. As shown in FIG. 5, the drive assembly 402 moves from an upright functional orientation (e.g., horizontal or near-horizontal orientation) at the position 504 to an intermediate position 506 before ultimately reaching a serviceable orientation (e.g., vertical or near-vertical orientation) at a position 508. When the drive assembly 402 is in the serviceable orientation at the position 508, the translating cartridge 404 (carrying the drive assembly 402) may be moved radially along the inner/outer radial side surface of the structural pier 110, as will be described below.

As described above, the drive assembly 402 coupled to the translating cartridge 404 is moved starting from the upright functional orientation (at the position 502) and ending at the serviceable orientation (at the position 508). However, in an aspect, the translating cartridge 404 alone may be moved from the upright functional orientation (position 502) to the serviceable orientation (position 508) without being coupled to the drive assembly 402. In another aspect, the wheel 106/bogie assembly 104 including the drive assembly 402 coupled to the translating cartridge 404 may be moved from the upright functional orientation (position 502) to the serviceable orientation (position 508).

In a further aspect, the drive assembly 402 and/or the translating cartridge 404 may be moved starting from the serviceable orientation (position 508) and ending at the upright functional orientation (position 502). For example, the drive assembly 402 and/or the translating cartridge 404 may initially be in the serviceable orientation (position 508). The slide carriage 410 may then facilitate a tilt of the drive assembly 402 and/or the translating cartridge 404 in an upward and forward direction (e.g., direction D) with respect to the wheel 106. The drive assembly 402 and/or the translating cartridge 404 may move from a serviceable orientation at the position 508 to the intermediate position 506 before reaching an upright functional orientation at the position 504. Notably, as the drive assembly 402/translating cartridge 404 moves from the intermediate position 506 to the upright functional orientation at the position 504, a center of mass of the drive assembly 402/translating cartridge 404 moves past a pivoting position such that the drive assembly 402/translating cartridge 404 can slide toward the wheel 106. At the position 504, the drive assembly 402 and/or the translating cartridge may be pushed toward the wheel 106 (i.e., pushed in the direction E) such that the one or more slide rails 408 pass through the slide carriage 410 in the longitudinal direction until the drive assembly 402 reaches the upright functional orientation at the position 502. At the position 502, the drive assembly 402 may be coupled to the wheel 106/bogie assembly 104.

As described above, the drive assembly 402 and/or the translating cartridge 404 is moved starting from the serviceable orientation (at the position 508) and ending at the upright functional orientation (at the position 502). However, in an aspect, the wheel 106/bogie assembly 104 including the drive assembly 402 coupled to the translating cartridge 404 may be moved from the serviceable orientation (position 508) to the upright functional orientation (position 502).

Figure 6:
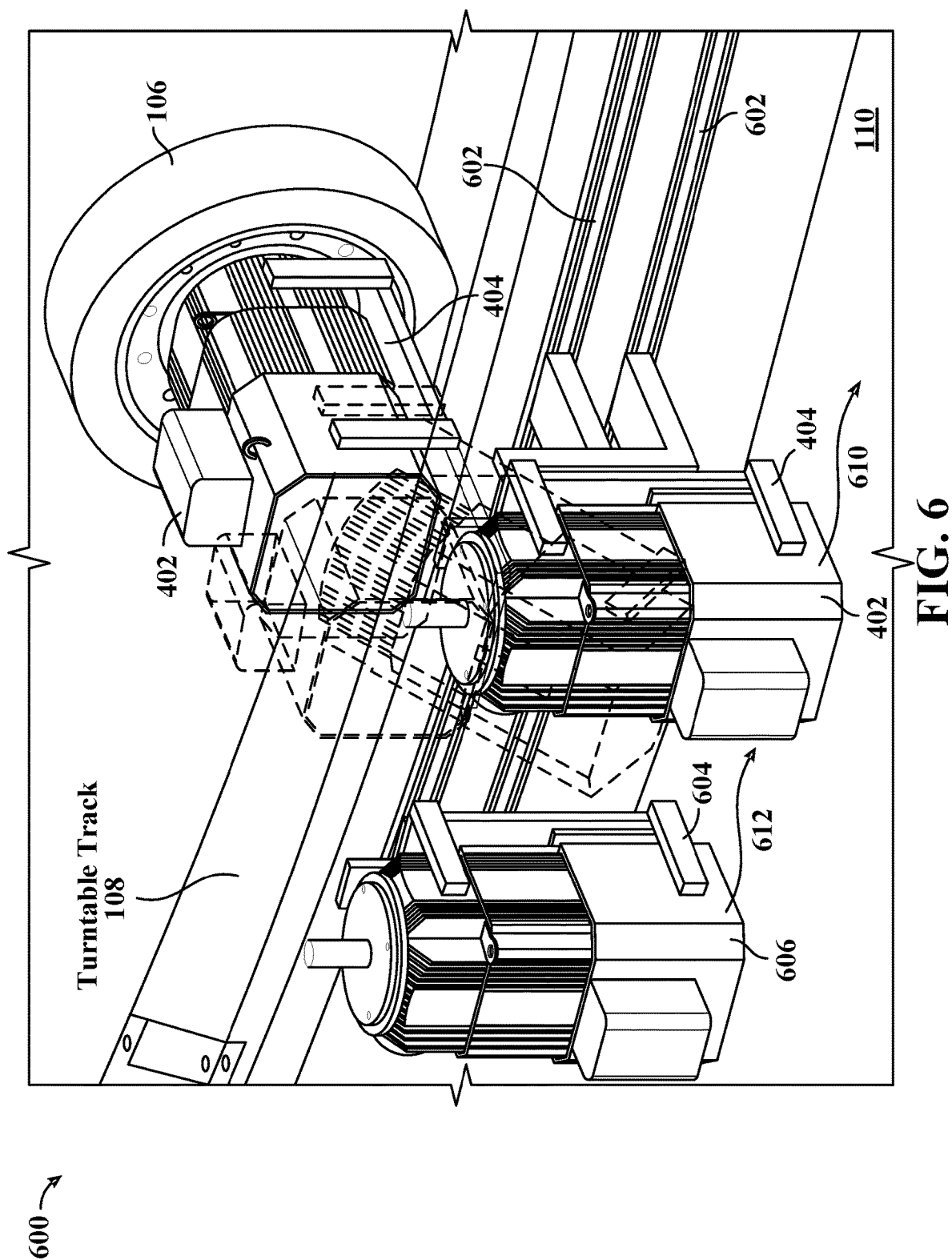
FIG. 6 illustrates an example implementation of the replacement system according to an aspect of the present disclosure.
Figure 7:
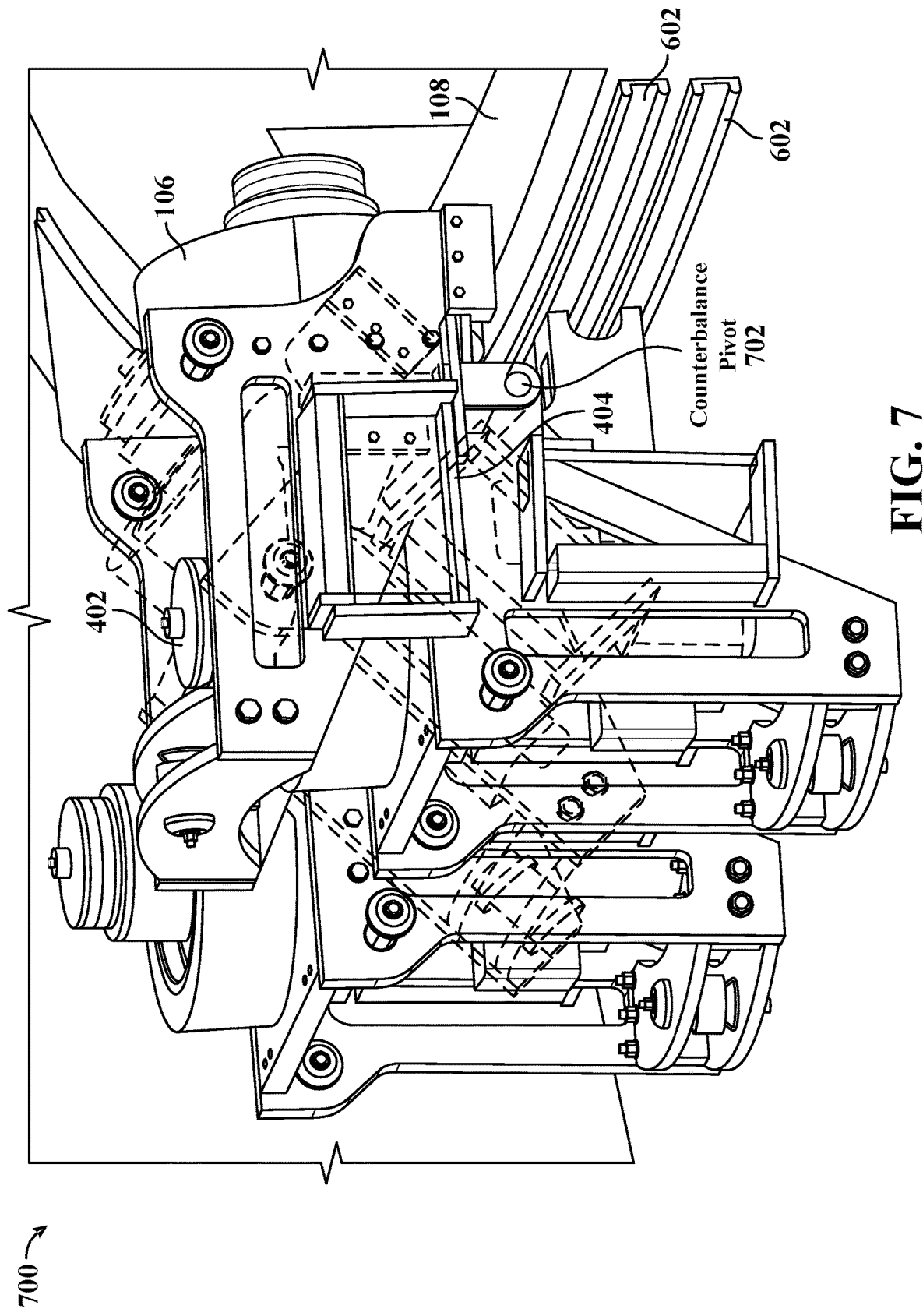
FIG. 7 illustrates another example implementation of the replacement system according to an aspect of the present disclosure.

FIG. 6 illustrates an example implementation 600 of the replacement system 400 according to an aspect of the present disclosure. FIG. 7 illustrates another example implementation 700 of the replacement system 400 according to an aspect of the present disclosure.

In an aspect, a swap rail 602 may be joined onto a radial side surface of the structural pier 110. As shown, the swap rail 602 runs along the outer radial side surface of the structural pier 110. However, in other aspects, the swap rail 602 may run along the inner radial side surface of the structural pier 110 (e.g., if the bogie assembly 104 is mounted such that a rear portion of the drive assembly 402 is in closer proximity to a center axis 120 of the station 100 than the wheel 106 as depicted in FIG. 2). The translating cartridge 404 may be movably mounted to the swap rail 602. As such, the translating cartridge 404 may move along the radial side surface of the structural pier 110 by sliding along the swap rail 602 when the translating cartridge 404 is set in a serviceable orientation (e.g., position 508 in FIG. 5).

In an aspect, a second translating cartridge 604 (similar to the translating cartridge 404 described above) may also be mounted to the swap rail 602. Thus, the second translating cartridge 604 may also move along the radial side surface of the structural pier 110 by sliding along the swap rail 602 when the second translating cartridge 604 is set in a serviceable orientation (e.g., position 508 in FIG. 5). In an aspect, the second translating cartridge 604 may be pre-loaded with a working drive assembly 606 (hot spare or replacement unit). In another aspect, the second translating cartridge 604 may be pre-loaded with a second wheel/bogie assembly including the working driving assembly 606.

In an example operation, when a drive assembly 402 is disabled (e.g., becomes a non-working drive assembly) and can no longer roll the wheel 106 to help rotate the turntable 102 about the axis 120, an empty translating cartridge 404 set in the serviceable orientation may be moved along the radial side surface of the structural pier 110 via the swap rail 602 to rest underneath the non-working drive assembly 402. Alternatively, the non-working drive assembly 402 may be moved toward the empty translating cartridge 404, e.g., by rotating the turntable 102 such that the wheel 106/bogie assembly 104 positions the non-working drive assembly 402 above the empty translating cartridge 404. For example, a control system of the turntable load station 100 may utilize encoders and absolute positioning to automatically index the turntable 102 until the non-working drive assembly 402 is at an unloading position along the track 108 (e.g., above the empty translating cartridge 404).

Once the non-working drive assembly 402 is positioned above the empty translating cartridge 404, the translating cartridge 404 may be tilted in an upward and forward direction (e.g., direction D shown in FIG. 5) to an upright functional orientation. Upon reaching the upright functional orientation, the translating cartridge 404 may be pushed forward toward the wheel 106 (e.g., direction E shown in FIG. 5) until the translating cartridge 404 is close enough to be coupled to the drive assembly 402. For example, the translating cartridge 404 may be pushed in the direction E until the adapter plate 406 and/or one or more upright bars 412 of the translating cartridge 404 can be mated to mounting points formed on an underside and/or side surfaces of the drive assembly 402. In another example, the adapter plate 406 and/or the one or more upright bars 412 may be coupled to the underside and/or the side surfaces of the drive assembly 402 via a vice clamp or strapping mechanism.

In an aspect, to help minimize a total duration for replacing the non-working drive assembly 402 and increase safety by minimizing an operator's/technician's exposure to hazards, any of the movements of the translating cartridge described herein may be automated. For example, after the control system indexes the turntable 102 until the non-working drive assembly 402 is at the unloading position along the track 108, the control system may further deploy the translating cartridge 404 to automatically position itself under the non-working drive assembly 402 and/or tilt itself to the upright functional orientation to be able to couple with the non-working drive assembly 402.

When the translating cartridge 404 is coupled to the drive assembly 402, the drive assembly 402 may then be decoupled from the bogie assembly 104 (e.g., by loosening fasteners binding the drive assembly 402 to the bogie assembly 104). Alternatively, when the translating cartridge 404 is coupled to the drive assembly 402, the bogie assembly 104 including the drive assembly 402 coupled to the translating cartridge 404 may be decoupled from the turntable 102. In an aspect, the translating cartridge 404 coupled to the drive assembly 402 is configured to lessen or remove compressive force between the drive assembly 402 and the bogie assembly 104 (and/or between the bogie assembly 104 and the turntable 102). Accordingly, when the compressive force is lessened or removed, the decoupling of the drive assembly 402 from the bogie assembly 104 (or the decoupling of the bogie assembly 104 from the turntable 102) may be performed in an easier and safer manner. Thereafter, the translating cartridge 404 carrying the non-working drive assembly 402 (or the bogie assembly 104 including the non-working drive assembly 402) may be tilted in a downward and away direction (e.g., direction C shown in FIG. 5) to return to the serviceable orientation. Once in the serviceable orientation, the translating cartridge 404/non-working drive assembly 402 may be moved (e.g., in a direction 610) along the radial side surface of the structural pier 110 away from the wheel 106/bogie assembly 104 (or away from the turntable 102). In an aspect, considering a weight of the drive assembly 402 carried by the translating cartridge 404, the translating cartridge 404 may be mounted to the swap rail 602 via a counterbalance pivot 702. The counterbalance pivot 702 may help tilt the translating cartridge 404/drive assembly 402 in the upward and forward direction (direction D shown in FIG. 5) and/or the downward and away direction (direction C shown in FIG. 5) by offsetting the weight of the drive assembly 402 exerted in one direction or another. In an aspect, the counterbalance pivot 702 may employ a spring, gas cylinder, or other type of counterbalancing device.

After the translating cartridge 404/non-working drive assembly 402 is moved away from the wheel 106/bogie assembly 104 (or away from the turntable 102), the second translating cartridge 604 pre-loaded with the working drive assembly 606 (hot spare, replacement unit, or second drive assembly) and set in the serviceable position (or pre-loaded with a second bogie assembly including the working drive assembly 606) may be moved (e.g., in a direction 612) along the radial side surface of the structural pier 110 to rest underneath the bogie assembly 104 (or the turntable 102). Once the second translating cartridge 604 is positioned underneath the bogie assembly 104 (or the turntable 102), the second translating cartridge 604 carrying the working drive assembly 606 (or carrying the second bogie assembly including the working drive assembly 606) may be tilted in an upward and forward direction (e.g., direction D shown in FIG. 5) to an upright functional orientation. In an aspect, considering a weight of the working drive assembly 606 carried by the second translating cartridge 604, the second translating cartridge 604 may be mounted to the swap rail 602 via a second counterbalance pivot (similar to the counterbalance pivot 702). The second counterbalance pivot may help tilt the second translating cartridge 604/working drive assembly 606 in the upward and forward direction (direction D shown in FIG. 5) and/or the downward and away direction (direction C shown in FIG. 5) by offsetting the weight of the working drive assembly 606 exerted in one direction or another.

Upon reaching the upright functional orientation, the second translating cartridge 604/working drive assembly 606 may be pushed forward toward the bogie assembly 104 (e.g., direction E shown in FIG. 5) until the working drive assembly 606 is close enough to be coupled to the bogie assembly 104. The working drive assembly 606 may then be coupled to the bogie assembly 104 (e.g., by tightening fasteners binding the working drive assembly 606 to the bogie assembly 104). In an aspect, the second translating cartridge 604 coupled to the working drive assembly 606 is configured to increase compressive force between the working drive assembly 606 and the bogie assembly 104 when installing the working drive assembly 606 (or between the second bogie assembly including the working drive assembly 606 and the turntable 102). Accordingly, when the compressive force is increased, the coupling of the working drive assembly 606 to the bogie assembly 104 (or the coupling of the second bogie assembly including the working drive assembly 606 to the turntable 102) may be performed in an easier and safer manner.

After coupling the working drive assembly 606 to the bogie assembly 104 (or coupling the second bogie assembly including the working drive assembly 606 to an underside of the turntable 102), the second translating cartridge 604 may be decoupled from the working drive assembly 606 (or from the second bogie assembly including the working drive assembly 606). For example, a second adapter plate and/or one or more second upright bars of the second translating cartridge may be decoupled from mounting points on an underside and/or side surfaces of the working drive assembly 606. Thereafter, the second translating cartridge 604 may be pulled away in the direction B (shown in FIG. 5) and caused to tilt in a downward and away direction (e.g., direction C shown in FIG. 5) to return to the serviceable orientation. Once in the serviceable orientation, the empty second translating cartridge 606 may remain empty in anticipation of receiving a future disabled drive assembly or may be re-loaded with a working drive assembly.

Figure 8:
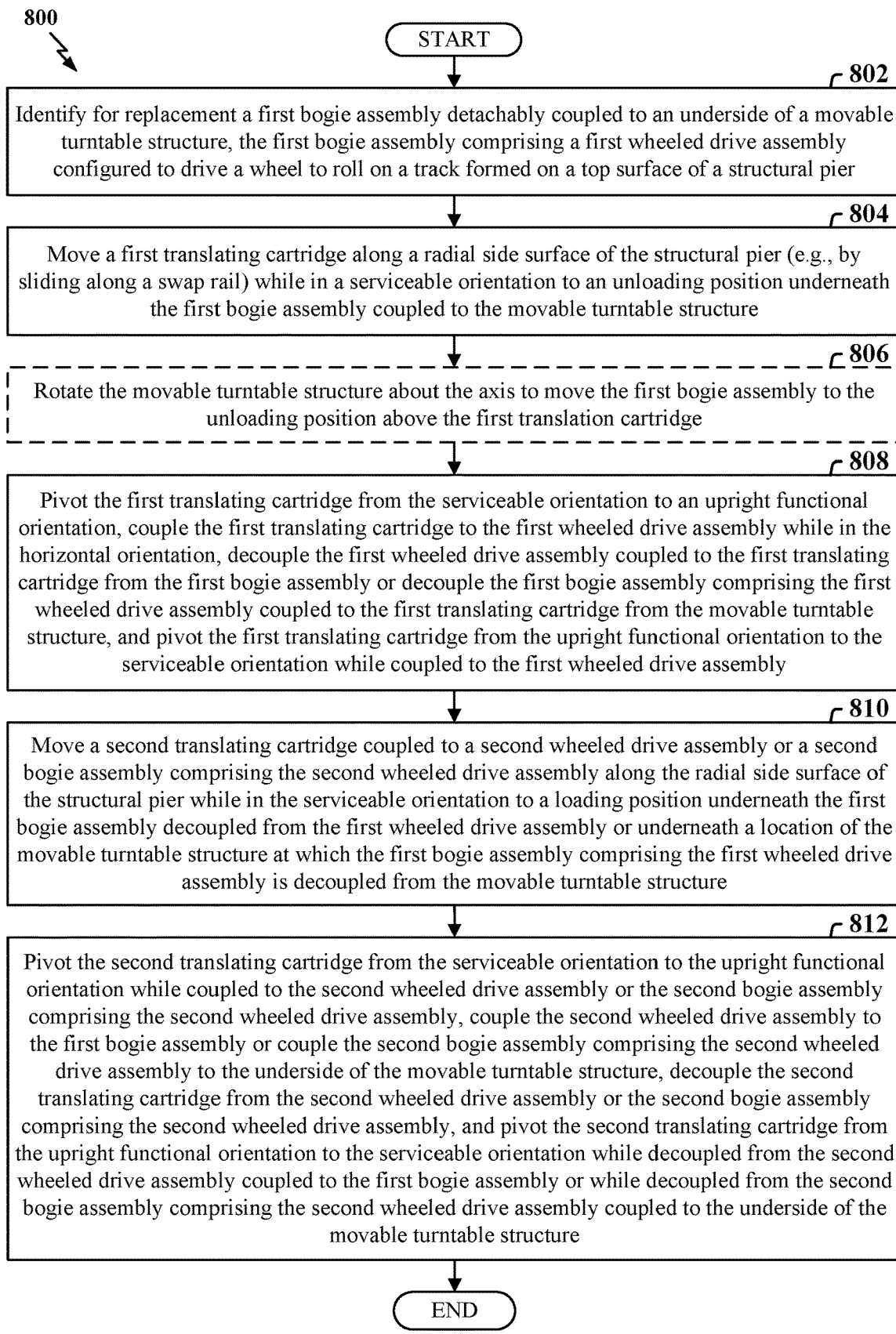
FIG. 8 is a flow chart illustrating an exemplary process for replacing a drive assembly of a turntable load station according to an aspect of the present disclosure.

FIG. 8 is a flow chart illustrating an exemplary process 800 for replacing a drive assembly of a turntable load station according to an aspect of the present disclosure. In some examples, the process 800 may be carried out by a control system of a turntable load station or any suitable apparatus or means for carrying out the functions or algorithm described below.

At block 802, the control system identifies for replacement a first bogie assembly (e.g., bogie assembly 104) detachably coupled to an underside of a movable turntable structure (e.g., turntable 102). The first bogie assembly includes a first wheeled drive assembly configured to drive a wheel (e.g., wheel 106) to roll on a track (e.g., track 108) formed on a top surface of a structural pier (e.g., pier 110). In an aspect, the first bogie assembly may be identified for replacement via manual or automated methods including methods based on inspecting a sensor. In an aspect, the wheel is coupled to an underside of the movable turntable structure via the first bogie assembly, wherein the movable turntable structure is caused to rotate about an axis (e.g., axis 120) when the first wheeled drive assembly drives the wheel to roll on the track.

At block 804, the control system moves a first translating cartridge (e.g., translating cartridge 404) along a radial side surface of the structural pier (e.g., by sliding along the swap rail 602) while in a serviceable orientation (e.g., orientation at position 508) to an unloading position underneath the first bogie assembly coupled to the movable turntable structure. At block 806, the control system may optionally rotate the movable turntable structure about the axis to move the first bogie assembly to the unloading position above the first translating cartridge.

At block 808, the control system pivots the first translating cartridge from the serviceable orientation to an upright functional orientation (e.g., orientation at position 502) and couples the first translating cartridge to the first wheeled drive assembly while in the upright functional orientation. Thereafter, the control system decouples the first wheeled drive assembly coupled to the first translating cartridge from the first bogie assembly or decouples the first bogie assembly comprising the first wheeled drive assembly coupled to the first translating cartridge from the movable turntable structure and pivots the first translating cartridge from the upright functional orientation to the serviceable orientation while coupled to the first wheeled drive assembly. In an aspect, pivoting the first translating cartridge may include offsetting a weight of the first wheeled drive assembly coupled to the first translating cartridge (e.g., using a counterbalance pivot 702) when the first translating cartridge pivots from the upright functional orientation to the serviceable orientation. The control system may further move the first translating cartridge along the radial side surface of the structural pier while in the serviceable orientation and coupled to the first wheeled drive assembly to a position away from the unloading position.

At block 810, the control system moves a second translating cartridge (e.g., second translating cartridge 604) coupled to a second wheeled drive assembly (e.g., second drive assembly 606) or a second bogie assembly comprising the second wheeled drive assembly along the radial side surface of the structural pier (e.g., by sliding along the swap rail 602) while in the serviceable orientation to a loading position underneath the first bogie assembly decoupled from the first wheeled drive assembly or underneath a location of the movable turntable structure at which the first bogie assembly comprising the first wheeled drive assembly is decoupled from the movable turntable structure.

At block 812, the control system pivots the second translating cartridge from the serviceable orientation to the upright functional orientation while coupled to the second wheeled drive assembly or the second bogie assembly comprising the second wheeled drive assembly and couples the second wheeled drive assembly to the first bogie assembly or couples the second bogie assembly comprising the second wheeled drive assembly to the underside of the movable turntable structure. In an aspect, pivoting the second translating cartridge includes offsetting a weight of the second wheeled drive assembly coupled to the second translating cartridge (e.g., using a counterbalance pivot) when the second translating cartridge pivots from the serviceable orientation to the upright functional orientation. Thereafter, the control system decouples the second translating cartridge from the second wheeled drive assembly or the second bogie assembly comprising the second wheeled drive assembly and pivots the second translating cartridge from the upright functional orientation to the serviceable orientation while decoupled from the second wheeled drive assembly coupled to the first bogie assembly or while decoupled from the second bogie assembly comprising the second wheeled drive assembly coupled to the underside of the movable turntable structure. The control system may further move the second translating cartridge along the radial side surface of the structural pier while in the serviceable orientation and decoupled from the second drive assembly to a position away from the loading position.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object.

One or more of the components, steps, features and/or functions illustrated in FIGS. 1-8 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-7 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A system for replacing a drive assembly of a turntable load station, the system comprising:
   a structural pier;
   a track formed on a top surface of the structural pier;
   a movable turntable structure;
   a first bogie assembly detachably coupled to an underside of the movable turntable structure, the first bogie assembly comprising a first wheeled drive assembly configured to drive a wheel to roll on the track;
   a swap rail mounted to a radial side surface of the structural pier; and
   a first translating cartridge movably mounted to the swap rail in a serviceable orientation, the first translating cartridge configured to pivot from the serviceable orientation to an upright functional orientation to couple with the first wheeled drive assembly and decouple the first wheeled drive assembly coupled to the first translating cartridge from the first bogie assembly or decouple the first bogie assembly comprising the first wheeled drive assembly coupled to the first translating cartridge from the movable turntable structure.

2. The system of claim 1, wherein the first translating cartridge is configured to move along the radial side surface of the structural pier via the swap rail while in the serviceable orientation to an unloading position underneath the first bogie assembly coupled to the movable turntable structure.

3. The system of claim 2, wherein the first translating cartridge is configured to:
   pivot from the upright functional orientation to the serviceable orientation while coupled to the first wheeled drive assembly; and
   move along the radial side surface of the structural pier via the swap rail while in the serviceable orientation and coupled to the first wheeled drive assembly to a position away from the unloading position.

4. The system of claim 1, wherein the first translating cartridge comprises:
   an adapter plate detachably coupled to an underside of the first wheeled drive assembly;
   a tilting slide carriage coupled to an underside of the adapter plate, the tilting slide carriage configured to pivot the translating cartridge between the serviceable orientation and the upright functional orientation; and
   one or more slide rails coupled to the underside of the adapter plate, the one or more slide rails configured to:
      slide the first translating cartridge in the upright functional orientation toward the first bogie assembly to couple the adapter plate to the first wheeled drive assembly,
      slide the first translating cartridge in the upright functional orientation away from the first bogie assembly when the adapter plate is coupled to the first wheeled drive assembly and the first wheeled drive assembly is decoupled from the first bogie assembly, or
      slide the first translating cartridge in the upright functional orientation away from the movable turntable structure when the adapter plate is coupled to the first wheeled drive assembly and the first bogie assembly comprising the first wheeled drive assembly is decoupled from the movable turntable structure.

5. The system of claim 4, further comprising:
a counterbalance pivot formed between the first translating cartridge and the swap rail, the counterbalance pivot configured to offset a weight of the first wheeled drive assembly coupled to the first translating cartridge when the first translating cartridge pivots between the serviceable orientation and the upright functional orientation.

6. The system of claim 4, further comprising a second translating cartridge movably mounted to the swap rail in the serviceable orientation, the second translating cartridge coupled to a second wheeled drive assembly or a second bogie assembly comprising the second wheeled drive assembly and configured to:
pivot from the serviceable orientation to the upright functional orientation while coupled to the second wheeled drive assembly or the second bogie assembly comprising the second wheeled drive assembly;
couple the second wheeled drive assembly to the first bogie assembly or couple the second bogie assembly comprising the second wheeled drive assembly to the underside of the movable turntable structure;
decouple from the second wheeled drive assembly or the second bogie assembly comprising the second wheeled drive assembly; and
pivot from the upright functional orientation to the serviceable orientation while decoupled from the second wheeled drive assembly coupled to the first bogie assembly or while decoupled from the second bogie assembly comprising the second wheeled drive assembly coupled to the underside of the movable turntable structure.

7. The system of claim 6, wherein the second translating cartridge comprises:
a second adapter plate detachably coupled to an underside of the second wheeled drive assembly;
a second tilting slide carriage coupled to an underside of the second adapter plate, the second tilting slide carriage configured to pivot the second translating cartridge between the serviceable orientation and the upright functional orientation; and
one or more second slide rails coupled to the underside of the second adapter plate, the one or more second slide rails configured to:
slide the second translating cartridge in the upright functional orientation to couple the second wheeled drive assembly to the first bogie assembly while the second adapter plate is coupled to the second wheeled drive assembly,
slide the second translating cartridge in the upright functional orientation to couple the second bogie assembly comprising the second wheeled drive assembly to the underside of the movable turntable structure while the second adapter plate is coupled to the second wheeled drive assembly,
slide the second translating cartridge in the upright functional orientation away from the first bogie assembly when the second wheeled drive assembly is coupled to the first bogie assembly and the second adapter plate is decoupled from the second wheeled drive assembly, or
slide the second translating cartridge in the upright functional orientation away from the movable turntable structure when the second bogie assembly comprising the second wheeled drive assembly is coupled to the underside of the movable turntable structure and the second adapter plate is decoupled from the second wheeled drive assembly.

8. The system of claim 7, further comprising:
a second counterbalance pivot formed between the second translating cartridge and the swap rail, the second counterbalance pivot configured to offset a weight of the second wheeled drive assembly coupled to the second translating cartridge when the second translating cartridge pivots between the serviceable orientation and the upright functional orientation.

9. The system of claim 7, wherein the second translating cartridge is configured to:
move along the radial side surface of the structural pier via the swap rail while in the serviceable orientation and coupled to the second wheeled drive assembly to a loading position underneath the first bogie assembly decoupled from the first wheeled drive assembly or underneath a location of the movable turntable structure at which the first bogie assembly comprising the first wheeled drive assembly is decoupled from the movable turntable structure; and
move along the radial side surface of the structural pier via the swap rail while in the serviceable orientation and decoupled from the second wheeled drive assembly to a position away from the loading position.

10. The system of claim 1, wherein:
the first bogie assembly is configured to couple the wheel to the underside of the movable turntable structure; and
the movable turntable structure is caused to rotate about an axis when the first wheeled drive assembly drives the wheel to roll on the track.

11. The system of claim 10, wherein the movable turntable structure is configured to rotate about the axis to move the first bogie assembly to an unloading position above the first translating cartridge.

12. A method for replacing a drive assembly of a turntable load station, the method comprising:
identifying for replacement a first bogie assembly detachably coupled to an underside of a movable turntable structure, the first bogie assembly comprising a first wheeled drive assembly configured to drive a wheel to roll on a track formed on a top surface of a structural pier;
moving a first translating cartridge along a radial side surface of the structural pier while in a serviceable orientation to an unloading position underneath the first bogie assembly coupled to the movable turntable structure;
pivoting the first translating cartridge from the serviceable orientation to an upright functional orientation;
coupling the first translating cartridge to the first wheeled drive assembly while in the upright functional orientation; and
decoupling the first wheeled drive assembly coupled to the first translating cartridge from the first bogie assembly or decoupling the first bogie assembly comprising the first wheeled drive assembly coupled to the first translating cartridge from the movable turntable structure.

13. The method of claim 12, further comprising:
pivoting the first translating cartridge from the upright functional orientation to the serviceable orientation while coupled to the first wheeled drive assembly; and
moving the first translating cartridge along the radial side surface of the structural pier while in the serviceable orientation and coupled to the first wheeled drive assembly to a position away from the unloading position.

14. The method of claim 13, wherein the pivoting of the first translating cartridge from the upright functional orientation to the serviceable orientation comprises:
offsetting a weight of the first wheeled drive assembly coupled to the first translating cartridge when the first translating cartridge pivots from the upright functional orientation to the serviceable orientation.

15. The method of claim 12, wherein the first bogie assembly is configured to couple the wheel to the underside of the movable turntable structure and the movable turntable structure is caused to rotate about an axis when the first wheeled drive assembly drives the wheel to roll on the track.

16. The method of claim 15, further comprising:
rotating the movable turntable structure about the axis to move the first bogie assembly to the unloading position above the first translating cartridge.

17. The method of claim 12, further comprising:
moving a second translating cartridge coupled to a second wheeled drive assembly or a second bogie assembly comprising the second wheeled drive assembly along the radial side surface of the structural pier while in the serviceable orientation to a loading position underneath the first bogie assembly decoupled from the first wheeled drive assembly or underneath a location of the movable turntable structure at which the first bogie assembly comprising the first wheeled drive assembly is decoupled from the movable turntable structure;
pivoting the second translating cartridge from the serviceable orientation to the upright functional orientation while coupled to the second wheeled drive assembly or the second bogie assembly comprising the second wheeled drive assembly;
coupling the second wheeled drive assembly to the first bogie assembly or coupling the second bogie assembly comprising the second wheeled drive assembly to the underside of the movable turntable structure;
decoupling the second translating cartridge from the second wheeled drive assembly or from the second bogie assembly comprising the second wheeled drive assembly; and
pivoting the second translating cartridge from the upright functional orientation to the serviceable orientation while decoupled from the second wheeled drive assembly coupled to the first bogie assembly or while decoupled from the second bogie assembly comprising the second wheeled drive assembly coupled to the underside of the movable turntable structure.

18. The method of claim 17, wherein the pivoting of the second translating cartridge from the serviceable orientation to the upright functional orientation comprises:
offsetting a weight of the second wheeled drive assembly coupled to the second translating cartridge when the second translating cartridge pivots from the serviceable orientation to the upright functional orientation.

19. The method of claim 17, further comprising:
moving the second translating cartridge along the radial side surface of the structural pier while in the serviceable orientation and decoupled from the second wheeled drive assembly to a position away from the loading position.

20. A turntable load station, the turntable load station comprising:

a structural pier;
a track formed on a top surface of the structural pier;
a movable turntable structure;
a first bogie assembly detachably coupled to an underside of the movable turntable structure, the first bogie assembly comprising a first wheeled drive assembly configured to drive a wheel to roll on the track, wherein the movable turntable structure is caused to rotate about an axis when the wheel rolls on the track;
a swap rail mounted to a radial side surface of the structural pier; and
a first translating cartridge movably mounted to the swap rail in a serviceable orientation, the first translating cartridge configured to:
move along the radial side surface of the structural pier via the swap rail while in the serviceable orientation to an unloading position underneath the first bogie assembly coupled to the movable turntable structure,
pivot from the serviceable orientation to an upright functional orientation to couple with the first wheeled drive assembly,
decouple the first wheeled drive assembly coupled to the first translating cartridge from the first bogie assembly or decouple the first bogie assembly comprising the first wheeled drive assembly coupled to the first translating cartridge from the movable turntable structure, and
pivot from the upright functional orientation to the serviceable orientation while coupled to the first wheeled drive assembly.

21. The turntable load station of claim 20, further comprising a second translating cartridge movably mounted to the swap rail in the serviceable orientation, the second translating cartridge coupled to a second wheeled drive assembly or a second bogie assembly comprising the second wheeled drive assembly and configured to:
move along the radial side surface of the structural pier while in the serviceable orientation to a loading position underneath the first bogie assembly decoupled from the first wheeled drive assembly or underneath a location of the movable turntable structure at which the first bogie assembly comprising the first wheeled drive assembly is decoupled from the movable turntable structure;
pivot from the serviceable orientation to the upright functional orientation while coupled to the second wheeled drive assembly or the second bogie assembly comprising the second wheeled drive assembly;
couple the second wheeled drive assembly to the first bogie assembly or couple the second bogie assembly comprising the second wheeled drive assembly to the underside of the movable turntable structure;
decouple from the second wheeled drive assembly or the second bogie assembly comprising the second wheeled drive assembly; and
pivot from the upright functional orientation to the serviceable orientation while decoupled from the second wheeled drive assembly coupled to the first bogie assembly or while decoupled from the second bogie assembly comprising the second wheeled drive assembly coupled to the underside of the movable turntable structure.

* * * * *